(No Model.)
C. E. OVERS.
BICYCLE SUPPORT.
No. 476,297.
Patented June 7, 1892.
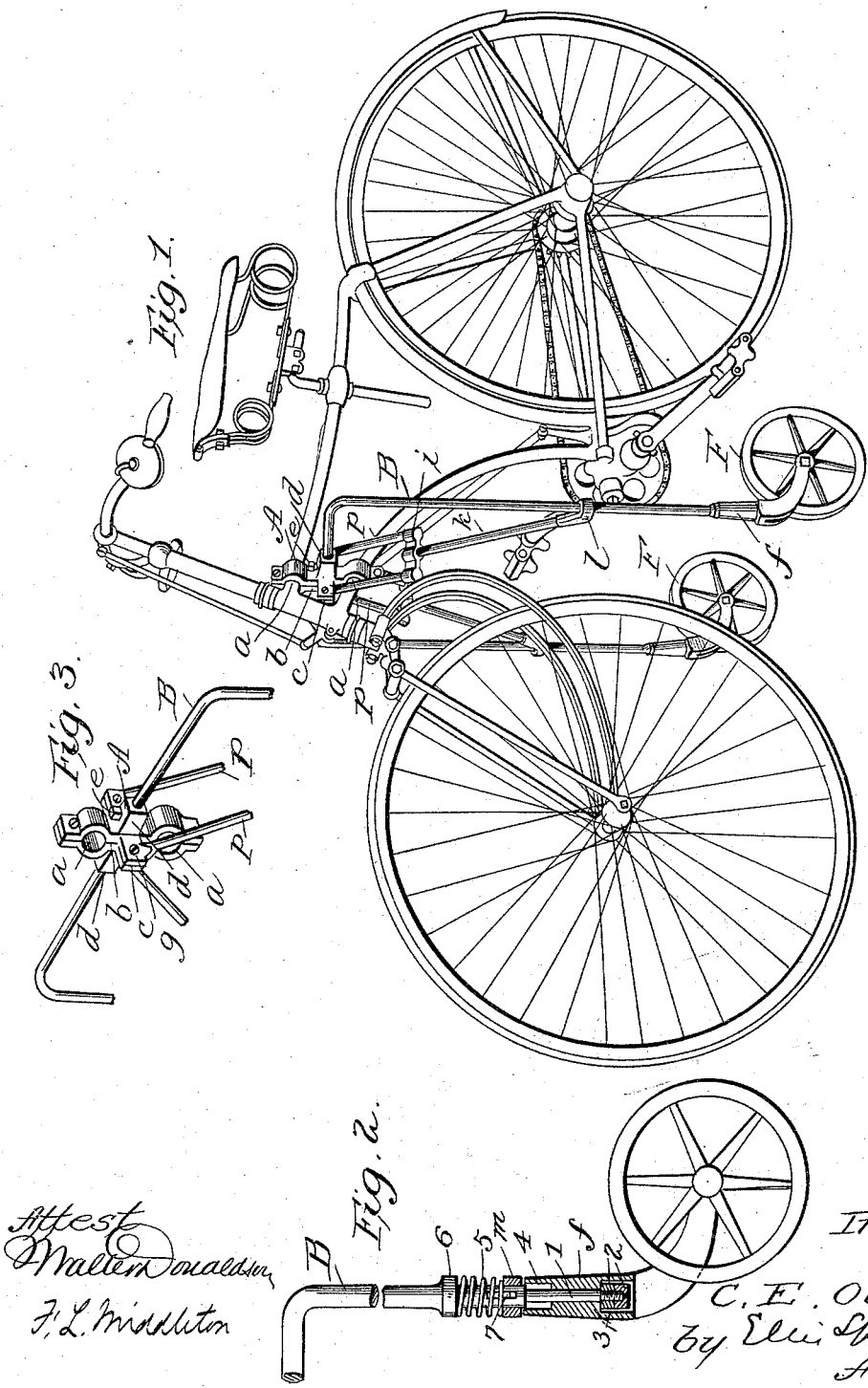
Attest
Walter Donaldson
F. L. Middleton
Inventor
C. E. Overs
by Ellis Spear
Atty.

UNITED STATES PATENT OFFICE.

CURTIS E. OVERS, OF ASHLAND, OHIO.

BICYCLE-SUPPORT.

SPECIFICATION forming part of Letters Patent No. 476,297, dated June 7, 1892.

Application filed February 17, 1892. Serial No. 421,845. (No model.)

*To all whom it may concern:*

Be it known that I, CURTIS E. OVERS, a citizen of the United States of America, residing at Ashland, in the county of Ashland and State of Ohio, have invented certain new and useful Improvements in Bicycle Attachments, of which the following is a specification.

My invention is an improved attachment for bicycles, designed to furnish a support to bicycles or like vehicles and designed to furnish the support for such vehicles when they are used by learners.

The invention consists, first, of outriggers having swiveled wheels carried by said outriggers; and it also consists of a special form of bracket on which the swiveled wheels are carried and of a special construction and combination of the clamp.

The invention is illustrated in the accompanying drawings, in which—

Figure 1 shows the pair of outriggers attached to a bicycle in perspective. Fig. 2 is a side elevation of one of the outriggers. Fig. 3 is a detail view of the clamp.

In the drawings, A represents the half of a clamp adapted to bear against a part of the frame of the bicycle. For the particular form of bicycle to which I have applied it it is made with two inclined bearing-faces $a\ a$, which are fitted to the reach or braces extending between the front and rear part of the machine. These, however, are representative only and may be changed according to the kind of machine to which the outrigger is applied. I have shown at $b$ the central bearing-faces adapted to fit the opposite clamp and at $c$ other bearing-faces, also adapted to fit the opposite clamp, and all preferably in the same plane. Through the bearing-faces $c\ c$ are holes to admit the bolts which clamp the parts together and hold the outrigger upon the machine.

The clamp A is provided on its rear face with a socket projection $d$, which receives the end of the standard B, this standard being held in the socket by means of a set-screw $e$. The upper end of the standard is bent to meet the clamp, the lower end or other part being vertical and carrying upon its lower end a swiveled caster-wheel F. The axis of the caster-wheel is in the pronged bent arm $f$, the upper end of which is in alignment with the lower end of the standard and is joined to it by the swivel. Upon the clamp are lateral wings $g\ g$, to which are attached the short brace-arms $p$ in an inclined position, as shown. Upon the ends of this is a yoke $i$, to which is connected the single brace $k$, extending down in an inclined position and fixed to the vertical part of the standard by a clamp $l$.

The apparatus is designed to be applied to the machine with the plane of the outrigger at right angles to the plane of the machine, so that when in place and when clamped upon the machine they support it laterally on both sides, while the caster-wheels on each side run in line with the movement of the machine and turn freely as the machine turns.

In order to prevent the clamp from abrading or defacing the part of the machine to which it is applied, I line the bearing-faces $a$ with leather or some suitable soft material.

It will be understood that the clamps are formed to fit equally on each side, and when in place their holes register and the two parts are held together by bolts in said holes, so that the parts may be easily and quickly applied and as easily removed. When in place, the machine cannot be thrown down laterally; but as the outriggers are in front of the treadles and with the caster-wheels outside of the limit of the range of movement the outriggers do not interfere with the working of the machine.

In going around curves it is desirable that the motion of the machine when it is used by learners with the outriggers attached should conform to the ordinary motion of the machine in riding—that is to say, it should be capable of inclination toward the center of the curve. In order to permit this, I have shown an interposed spring, which permits the standard to shorten under increased pressure, due to the inclination of the rider on the machine. Such a spring may be interposed into the standard or its connection in various ways; but a simple form and one which is convenient and efficient is shown in Fig. 2. The lower end of the standard B is reduced at 1, where it passes through the arm F of the yoke of the swiveled wheel. The lower end of this reduced part is screw-threaded and is held by the nuts 2 in the socket 3 of the arm, the construction being such as to permit the yoke to swivel on the reduced part, while the said reduced part may have free sliding movement vertically through the arm. The arm $f$ has a socket 4 at its upper end to receive the full thickness of the standards. The spring 5 is interposed between the enlargement 6 on the standard and a collar $m$, held to the standard by a pin passing through a slot 7 in the standard. This permits the standard to move vertically through the collar, which forms a bearing for the spring and for the upper end of the arm $f$.

I claim as my invention—

1. A pair of outriggers, each provided with a clamp fitted to each other and embracing a part of the machine, said outriggers extending laterally when in place, supporting the machine on both sides, substantially as described.

2. An outrigger having a half-clamp fitted to the machine, said clamp being provided with a hollow boss, a standard $b$, held in the boss, and a brace extending between the clamp and the vertical part of the standard, substantially as described.

3. The clamp part having the bearings $a\ a$ and the boss for holding the standard, combined with the brace, substantially as described.

4. In an outrigger, a standard, a swiveled caster-wheel having vertical movement on the standard, and a spring between the standard and the caster-wheel, substantially as described.

5. In an outrigger for bicycles, a standard, a swiveled caster-wheel fitted to said standard to allow vertical movement of the same, the said standard being slotted, the collar, the pin for securing the collar to the standard, and the spring bearing upon the collar and standard, substantially as described.

In testimony whereof I affix my signature in presence of two witnesses.

CURTIS E. OVERS.

Witnesses:
W. O. McDOWELL,
J. E. SPRENG.